OPTO-ELECTRIC LOGIC ELEMENTS

This is a continuation-in-part of application Ser. No. 647,493 filed 9/3/84, now abandoned.

BACKGROUND OF THE INVENTION

The present invention relates to an opto-electric logic element, and more particularly to an opto-electric logic element which is capable of performing a logical operation upon at least one optical input signal and at least one electrical input signal. The logic element may also be capable of storing an optical input signal.

Optical communications using optical fibers is expected to find wide use in the future, partially because optical fibers have a wide frequency bandwidth, which permits the rapid transmission of a large quantity of information. Also, optical fibers are immune to induction noise. In an optical communications system, the information to be transmitted is converted into an optical signal from an electrical signal by means of a transmitting apparatus, and the optical signal is transmitted through optical fibers and is subsequently converted into an electrical signal at a receiver. The optical signal is utilized as a mere transmission medium which serves to transfer a signal from one point to another, taking advantage of the fact that the transmission loss of the optical fibers constituting the transmission path is very small. Heretofore, the optical signals have not played a positive role in signal processing, i.e., logical operations have not been performed using optical signals, per se. The field of application of optical communications systems would be greatly widened if it were possible to perform logical operations upon combinations of optical and electrical signals. Likewise, if the storage of an optical signal could be accomplished under the control of an electrical signal, and if the results of operation and storage could be obtained in the form of optical signals, greater use could be made of optical communications systems.

SUMMARY OF THE INVENTION

It is an object of this invention to provide a novel opto-electric logic element which is capable of executing a logical operation in response to a combination of optical and electrical inputs, storing an optical signal, and outputting a result of such a logic operation in the form of an optical signal. According to the invention, there is provided an opto-electric logic element comprising a semiconductor laser having a differential gain characteristic or an optical bistable characteristic, which receives at least one light input, and a control circuit for varying the injection current to the semiconductor laser in accordance with an input electrical signal.

BRIEF DESCRIPTION OF THE DRAWINGS

Further objects and advantages of the invention will be more fully understood from the following detailed description taken in conjunction with the accompanying drawings, wherein:

FIG. 3 illustrates the differential gain characteristic of the semiconductor laser under the condition where no input light signal is supplied to the laser;

FIG. 4 shows the relation between the input and the output optical signals of the semiconductor laser when the injection current $i = i_1$;

FIG. 5 illustrates the relation between the input and output optical signals of the semiconductor laser when the injection current $i = i_2$;

FIG. 6 illustrates the relation between the input and output optical signals of the semiconductor laser when the injection current $i = i_3$;

FIGS. 7 and 8 are truth tables useful in explaining the operation of the first embodiment of the invention;

FIG. 9 illustrates the bistable characteristic of a semiconductor laser under the condition where no input light signal is supplied to the laser;

FIGS. 10–12 illustrate the relationships between the input and output optical signals of the laser of FIG. 9 where the injection currents i are respectively equal to $i_1$, $i_2$ and $i_3$;

FIG. 13 is a block diagram illustrating a second embodiment of the invention;

FIGS. 14 and 15 illustrate characteristics of the semiconductor laser used in the second embodiment of the invention; and FIG. 16 is a table illustrating the operation of the second embodiment.

DESCRIPTION OF THE PREFERRED EMBODIMENTS

Figure 1:
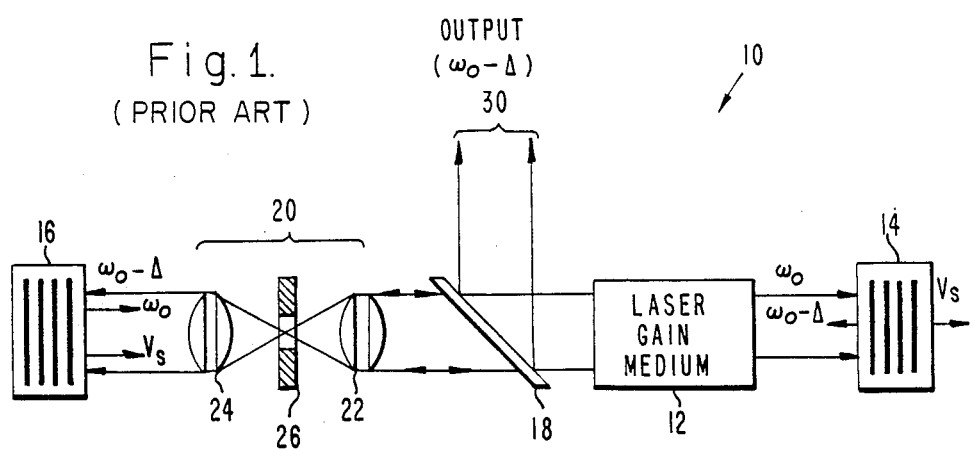
FIG. 1 is a perspective view showing a first embodiment of the invention.

Referring to FIG. 1, a first embodiment of the invention comprises a semiconductor laser 104 which receives optical input signals 106 and 107 and which outputs an optical output signal 105. A current drive circuit 102 varies a current i supplied to the semiconductor laser 104 via a signal line 103 in accordance with a signal on an input electrical signal line 101.

Figure 2:
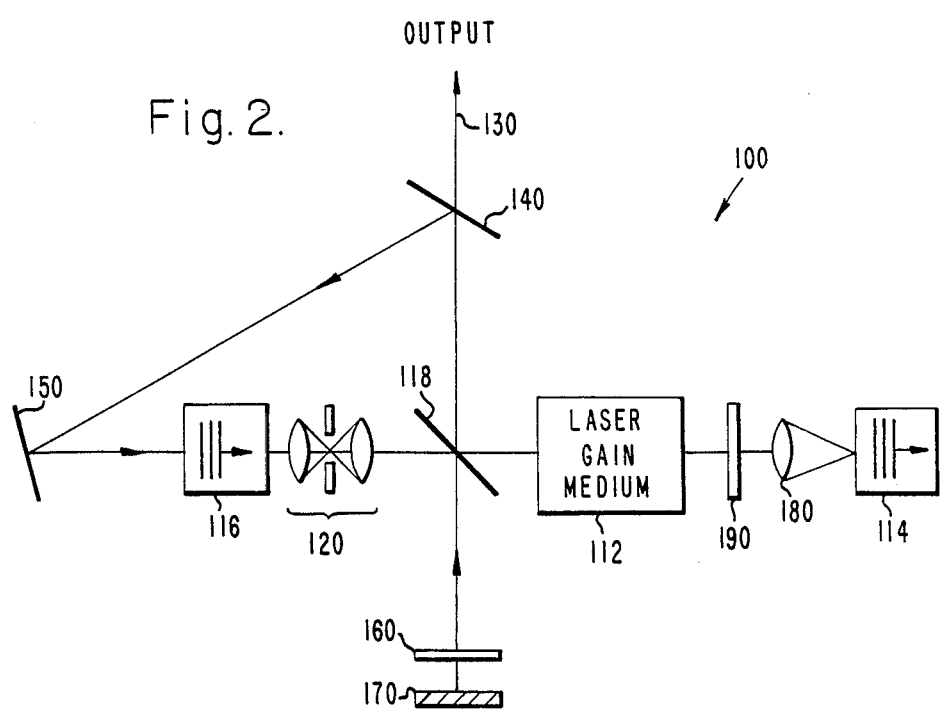
FIG. 2 is a circuit diagram illustrating a current drive circuit used in the first embodiment.

As shown in FIG. 2, the current drive circuit 102 shown in FIG. 1 comprises a transistor 201 having its base electrode connected to the signal line 101, a resistor 202 of resistance value $R_1$, having one end connected to the emitter electrode of transistor 201, a resistor 203 connected between the emitter and collector electrodes of the transistor 201 and having a resistance value $R_2$, and a power supply terminal 204 supplied with a voltage $+V_{EE}$ and connected to the other end of the resistor 202.

When a sufficiently large positive voltage is applied to the base electrode of the transistor 201 via signal line 101, the transistor 201 will be turned off so that a current i (equal to $V_{EE}/(R_1+R_2+r_1)$) will flow to the semiconductor laser 104 connected to the collector electrode of the transistor 201. In the foregoing equation for the current i, $r_1$ represents the internal resistance of the semiconductor laser 104.

When the base potential of transistor 201 is zero, the transistor 201 is turned on to supply a current i equal to $V_{EE}/(R_1+r_1+r_2)$ to the semiconductor laser 104, where $r_2$ represents the internal resistance of the transistor 201, and where $R_2$ is much greater than $r_2$. As described above, the circuit shown in FIG. 2 can supply a binary current to the semiconductor laser 104 in response to the voltage of an externally applied signal. The levels of the binary current can be set to any desired values by suitably selecting the resistances of resistors 202 and 203.

In connection with the semiconductor laser possessing a differential gain characteristic, FIG. 3 illustrates the relationship between the light quantity of the output optical signal 105 and the value of the injection current

U.S. Patent    Jan. 31, 1989    4,802,176

DOUBLE MOVING GRATING LASER

GOVERNMENT RIGHTS

The U.S. Government has certain rights in this invention pursuant to contract F29601-81-C-0025 between Hughes Aircraft Company and the Department of the Air Force.

BACKGROUND OF THE INVENTION

The present invention relates to lasers and more particularly to lasers employing phase conjugate mirrors for correcting wavefront distortions. The present invention further relates to an apparatus and method for employing Stimulated Brillouin scattering media for creating matching or compensating sets of moving reflective gratings.

In an ideal laser, the resonant cavity is perfectly tuned and could support a single oscillation mode containing all the stored energy. The lasing medium can efficiently impart energy to the oscillating radiation but would not otherwise interact with the radiation. However, an ideal laser does not exist and many problems exist that tend to degrade the operation of lasers and laser systems, especially those utilizing advanced technology lasing media or optical elements.

The optical elements defining a laser resonant cavity are subject to several disturbing effects including vibration, misalignment, or thermal stress. Advanced lasers or laser systems may employ many specialized elements such as steering mirrors, Q-switches, lenses, or beam clippers. All of these elements must be precisely aligned and relatively fixed with respect to each other in order to support a single mode within the laser gain media linewidth. Vibration or poor construction technique can lead to misalignment or random re-positioning. In addition, the high energy density found in high energy state of the art lasers can cause thermal distortion of reflective surfaces altering reflectivity and alignment. These effects alter the laser resonant cavity dimensions which degrade cavity tuning, resulting in poor mode selection or rejection.

At the same time, the lasing medium itself, unlike an idealized medium, disturbs the radiation by virtue of aberrations. These aberrations include media non-uniformities such as defects or impurities in solid state media, thermally induced index changes, or turbulence and concentration variations in gas or liquid media. Aberrations in the idealized path or transfer function of laser radiation causes optical path variations, which results in decreased spatial intensity at the focal plane as a consequence of defocussing and distortion of wavefronts. The multipass nature of laser oscillators greatly enhances any distortions due to aberrations multiple encounters of the aberrations by the wavefronts. The result is an oscillation with greatly distorted modes which degrades the ability to efficiently extract from the inverted population of the cavity. In addition, time varying media aberrations can cause wavelength or frequency variations in the radiation injected into the cavity by the media.

These undesirable conditions result in lower system efficiency, and keep a laser from performing at its diffraction limit, ie., optimum focusing and energy transfer capability thus reducing the extractable power. They also lead to spectral broadening of the laser output which contains distorted wavefronts. In order to prevent these undesirable results, several techniques have been proposed for many laser applications.

Previously, in order to solve these problems, a high degree of accuracy in the fabrication of the optical components (typically better than 1/10 wavelength) was required, and oscillator cavities that were extremely mechanically stable were utilized. Accurate alignment of focusing elements, such as cavity mirrors, apertures and the like are critical in the conventional laser resonator. This accuracy is achieved only at great expense both in terms of cost and fabrication complexity. In addition, the requirement for extreme physical accuracy and rigidity severely limits the use of lasers outside of a laboratory setting. Most laser components are generally subjected to a variety of forces requiring structural reinforcement to maintain optical accuracy. Therefore, it is desirable to reduce the alignment sensitivity of individual optical elements.

Two approaches known for minimizing alignment sensitivity involve the use of retroreflectors such as "corner cube" or "cats-eye" reflectors. Such reflective elements reflect collimated radiation in an angular direction identical to the incident angle, which thereby eliminates the necessity of precise angular alignment of the reflecting element surface. The corner cube, however, creates polarization distortions which make it unsuitable for many applications and the cat's eye reflector suffers from power limitations caused by a small spot size.

An approach proposed for addressing extra-cavity aberrations such as atmospheric perturbations is the application of a wavefront correction device in the laser optical element chain. Two examples of a proposed type of wavefront correction device are found in the mechanically deformable mirrors described in U.S. Pat. Nos. 3,731,103 and 4,005,935 issued to the present assignee of the instant application. While these systems perform their designed functions, they require external laser beam sampling to provide a feedback loop for mirror deformation control which increases complexity and expense. Deformable mirror systems also suffer from restricted spatial bandwidth, speed of response, the requirement of high voltage power supplies, and mirror pin cushion distortions and print through. In addition, such systems have a high degree of complexity for more advanced applications which increases system cost and lowers reliability.

A more recent development in the field of lasers is the use of phase conjugation to prevent inter-cavity aberrations and operational irregularities from degrading laser operation. Such lasers employ one or more phase conjugate reflectors, realized by nonlinear optical interactions which are used to generate the spatial phase conjugate of a distorted wavefront, which when retransmitted through the original distorting optical path forms a corrected beam. Therefore, planar waves initially injected into a laser cavity by a lasing medium or otherwise reflected from a surface into a laser gas medium are returned as plane waves. In phase conjugate resonators a planar or other suitably chosen or well figured mirror may substitute for the planar wave injected into the laser cavity.

The nonlinear interactions of a phase conjugate reflector automatically perform a phase front correction without external wavefront sensing or electronic controls. This can provide high optical speed and economy of design.

Nonlinear phase conjugation offers advantages over conventional means of aberration control in that it does not require electronic feedback, auxiliary power supplies, mirror cooling or many other features. The use of phase conjugate mirrors has greatly improved the far field patterns from lasers by decreasing the effects of internal or external aberrations. Also efficiency of energy extraction can be increased by recovering radiation that is otherwise lost by diffraction in conventional resonators. This is not accomplished, however, without additional problems.

Because of its high reflectivity and efficiency, the most promising phase conjugate medium is one that operates by using the Stimulated Brillouin Scattering (SBS) process. SBS phase conjugate reflectors function by establishing a grating which reflects incident radiation. The grating is in fact created by the interaction of incident radiation with the medium comprising the phase conjugate reflector. The grating is an acoustic wave which moves at sonic speed through the phase conjugate reflector medium in the same direction of travel as the incident radiation. Therefore, incident radiation reflected from the moving grating undergoes a small doppler shift. Even though the wavelength shift is small, typically a few gigahertz, it is also cumulative due to the multipass nature of the resonant cavity. Whenever radiation traverses or passes through the laser resonant cavity it undergoes an additional wavelength shift. This results in a wavelength or frequency "walk-off". The term "walk-off" is used to denote the fact that pass by pass the radiation walks away from the peak gain wavelength of the lasing medium.

The shift in frequency or wavelength for reflected radiation leads to several problems. First, it can produce a series of output frequencies which creates undesirable spectral broadening. Second, the detuning of the radiation wavelength, away from the wavelength of maximum laser gain for radiation oscillating in the laser resonant cavity leads to decreased efficiency for energy transfer and lower output power. Third, at some point the "walk-off" can cause the radiation to reach an unstable point for supporting the phase conjugation process as where Stimulated Brillouin Scattering cannot be achieved due to a low intensity function. Fourth, while for many wide bandwidth laser gain media, limited "walk-off" can be tolerated, eventually the radiation is shifted outside of the laser gain linewidth such that steady-state operation is not possible.

Therefore, what is needed is a method for preventing the frequency walk-off in phase conjugate reflectors for use in high quality or high power laser sources. One solution would be to use an SBS mirror with a rapid flowing gas cell. The gas would flow at sonic velocity in a directive opposite to the incident laser beam.

In order to solve some of the above problems, the present invention provides a method and apparatus for achieving phase conjugate reflection in a laser apparatus without walk-off. It is also a purpose of the present invention to achieve phase conjugation in a laser without reference to external compensation schemes.

Another purpose of this invention is to provide an improved laser that corrects for aberrations in laser wavefronts to allow them to operate at or near the diffraction limit.

SUMMARY OF THE INVENTION

These and other purposes and functions are achieved in a laser system constructed according to the method of the present invention. A laser apparatus is provided having a gain medium disposed along an optical path between a first and second reflector with the first one being a phase conjugate reflector. The second reflector comprises an SBS medium for generating a moving grating, but without forming an SBS mirror. Output coupling means is positioned between the medium and the second, non-phase conjugate, reflector for providing a beam of output radiation.

A third reflection means is positioned in the optical path of the laser output beam for intercepting and reflecting a predetermined percentage of the output radiation. This reflected radiation is directed to the back or non-medium side of the second reflector by employing a fourth reflection means. The fourth reflections means receives radiation from the third reflection means and directs it into the second (SBS) reflector along an optical path toward the laser medium that is substantially parallel to the first optical path of the laser.

A moving acoustical grating is thereby generated in the second reflector for reflecting laser radiation incident on the grating from the laser medium side, after upshifting the frequency thereof, but without creating the phase conjugate thereof.

The laser of the invention can further comprise spatial filter means positioned along said optical path between the output coupling means and the second reflector for removing undesirable extraneous modes.

In a further aspect of the invention the coupling means in the laser comprises a beam splitter. A fifth reflection means is positioned so as to receive and reflect radiation which is already reflected by the second reflector and also reflected by the beam splitter along an optical path opposite the output beam direction. A first polarization rotation means disposed between the fifth reflection means and beam splitter acts to rotate the polarization of this radiation so that it is returned through the beam splitter and combined with the output beam. At the same time a second polarization rotation means is disposed between the gain medium and the phase conjugate reflector to control the polarization rotation of radiation returning through the gain medium so that it will be reflected as the output beam.

In another aspect of the invention a focusing means is disposed along the first optical path adjacent to the phase conjugate reflector for focusing radiation into said phase conjugate reflector.

In yet another aspect of the invention the third reflection means is an optical quality plate and it is partially mirrored so as to reflect between about 7 to about 12 percent of the incident radiation in said output beam.

BRIEF DESCRIPTION OF THE DRAWINGS

The novel features of the present invention may be better understood from the accompanying description when taken in conjunction with the accompanying drawings in which like characters refer to like parts and in which:

FIG. 1 illustrates a schematic diagram for a general laser resonator employing two resonant cavity reflectors employing moving gratings, with motion in the same direction as required to compensate the frequency offset.

FIG. 2 illustrates a schematic diagram for a particular laser constructed according to the principles of the present invention.

DESCRIPTION OF THE PREFERRED EMBODIMENTS

Referring in more detail to the figures, FIG. 1 illustrates a conceptual design for a proposed laser 10 incorporating both wavefront error or aberration correction and doppler shift correction.

The resonant optical cavity of laser 10 employs laser gain media 12 positioned along an optical path between a phase conjugate reflector 14 and a reflective grating 16. Also included in laser 10 is an output coupler 18 and a spatial filter 20.

Laser gain media 12 comprises any laser medium known to be useful in the art such as HeNe, I, Cu, or $CO_2$ gases; Neodymium type glasses; various laser dyes; or Nd:YAG, Nd:YAlG, type solid-state materials. Many types of storage and pumping apparatus are known in the art to be useful for providing the necessary driving energy for the various laser media. A specific energy source is not shown in FIG. 1 for clarity in illustrating the elements of the invention.

In order to transfer energy out of laser 10, output coupling means or coupler 18 is positioned between reflective grating 16 and medium 12. Output coupler 18 may for example comprise an optical plate or beam splitter which is partially reflective so as to intercept and reflect a predetermined percentage of optical radiation traversing the resonant cavity of laser 10 and form output beam 30. The precise amount of extracted energy or reflected radiation is determined from known operating parameters and the useful amount of energy that can be extracted, as known in the art, for the medium used. Radiation not reflected by output coupler 18, encounters grating 16 where it is frequency shifted and reflected back through coupler 18 and into medium 12.

It is desirable to maintain a laser output having minimum spatial variations or spectral broadening. To accomplish this a spatial filter 20 can be positioned between reflector 16 and medium 12. This filter decreases spatial divergence in the radiation arriving at reflector 18 by narrowly focusing the radiation and simply blocking the passage of high frequency modes positioned outside of the fine focal region or waist chosen. Further, the spatial filter serves to define the modal axis and hence the radiation angle of the output beam. A certain percentage of the laser radiation is discarded or lost in using a spatial filter. However, since we are employing a phase conjugate reflector elsewhere in laser 10, the percentage of radiation lost will be minimal and it decreases as the laser operates. Further the power loss is low since the circulating power at this end of the resonator is low compared to the output power. Spatial filter 20 comprises known elements such as lens assemblies 22 and 24 which focus radiation through a pinhole assembly 26.

In general, resonators can be constructed wherein phase conjugate reflector 14 can comprise a variety of materials or devices known to provide phase reversal of incident radiation including Stimulated Raman Scattering (SRS) cells, Stimulated Brillouin Scattering (SBS) cells, or Four Mixers (FWM). However, Stimulated Brillouin Scattering (SBS) type devices have advantages for this application in that SBS offers strong potential for simultaneous high-efficiency operation and good conjugation. The SBS process generally appears to be quite efficient, providing on the order of 50 to 80 percent backscattering or reflection of incident radiation. In addition, unlike four wave mixing no additional pump sources are required and unlike SRS the frequency shifts are small. Therefore, the preferred embodiment of the present invention employs an SBS cell for reflector 14.

In the simple configuration of FIG. 1, radiation oscillates within the resonator of laser 10, between reflectors 14 and 16 with a predetermined percentage being coupled out as output beam 30. As previously discussed, phase conjugate reflector 14 acts to reflect incident radiation back along the identical optical path. This causes incident radiation to re-traverse any previously encountered aberrations along a nearly identical optical path but in the reverse direction. Therefore, wavefront distortions or errors are effectively cancelled in the output beam.

Radiation, however, reflected from phase conjugate reflector 14 is doppler shifted as previously mentioned. This wavelength or frequency shift occurs due to the nature of the SBS phase conjugation process.

In SBS cell 14, a high energy electric field associated with incident radiation propagates through the phase conjugator medium. For sufficiently high intensities, this high energy electric field interacts with the medium through the process of electrostriction and creates a high pressure sound wave, also traveling through the medium. The resultant traveling pressure wave alters the medium, forming a pattern of localized density increases or refractive index changes from the electrostrictive pressure. This pattern appears as an acoustic wave, or grating moving through the medium and having a periodicity approximately twice that of the incident radiation. The grating or refractive index patterns in the acoustic wave act as a reflective grating for the incident laser radiation. Due to the focused nature of the incident radiation wavelength and the enhanced SBS gain associated with conjugate waves, the reflected radiation will be the complex conjugate of the incident radiation.

However, the induced gratings are moving through the medium with some finite velocity, "v." Therefore, reflected radiation undergoes an effective doppler shift proportional to the velocity of the grating away from the direction of incidence. This downward frequency shift or offset, dv, is given by:

$$d\nu = 2 V/\lambda \tag{1}$$

where "v" is the sound speed in the SBS medium of the pressure or acoustic wave and lambda ($\lambda$) is the wavelength for the incident radiation in issue. Typical sound speeds range from 300 to 3000 m/sec. so that typical doppler shifts expected have a corresponding range from 450 to 4500 MHz or 0.015 to 0.15 $cm^{-1}$.

This requires that the gratings of reflectors 14 and 16 move in phase with substantially identical velocities. This also requires that the two gratings move in the same direction with respect to a common reference point in the resonator. Thus, while the grating of reflector 14 moves away from medium 12, the grating of reflector 16 must move toward medium 12. Furthermore, radiation reflected by reflector 14 is down-shifted in frequency by a factor of dv while radiation reflected by reflector 16 is upshifted by a factor of dv and amplified on each pass through medium 12. The radiation does not walk-off from the preferred central mode, providing an improved spectral quality and more efficient laser 10 output.

While it is possible for a double-passed acousto-optic cell to create an acoustical grating for reflector 16, the frequency shifts available from such cells are too low to match typical SBS frequency shifts. Thus it appears that acoustical waves generated by SBS interactions would be more practical. Therefore, reflector 16 should preferably comprise an SBS cell.

Unfortunately laser 10, as illustrated in FIG. 1, cannot simply employ an SBS cell for reflector 16. This follows from the fact that radiation traversing medium 12 from reflector 14 would establish a moving grating in the reflector 16 (SBS) medium moving in the same direction as the incident radiation. This would establish an acoustical wave moving away from medium 12 in a similar manner to reflector 14. In this case, the doppler shift of reflector 16 is another downshift, $dv$, which would not compensate but accelerate the walk-off process. Instead, the moving grating of reflector 16 must be created so as to have a velocity toward medium 12.

The single grating created in the SBS cell of reflector 14 results from aberrated wavefronts. The SBS interactions will, therefore, produce an aberrated acoustic wave which in turn provides an aberrated reflective grating. While this grating provides the complex conjugate necessary to compensate the aberrations previously encountered by radiation incident from one side, the same reflective pattern does not produce a high quality reflector for radiation incident from the other side. The resulting reflected grating may be spatially filtered but the loss in beam power is very high.

The present invention presents a new method and apparatus for realizing this second grating and avoiding the aberration problem. This is achieved by a new laser 20 constructed according to the principles of the present invention, as illustrated in FIG. 2.

The basic optical resonator of FIG. 2 is the same as that of FIG. 1 and having laser gain medium 112 which is pumped by an energy source, not shown, positioned along an optical path between two reflectors 114 and 116. Both reflectors 114 and 116 comprise SBS cells. However, both of these cells will not produce gratings from radiation directly incident from medium 112.

A reflector 140 is disposed along the path of the output beam for laser 100 in order to redirect or capture a predetermined percentage of the light emerging from medium 112. Reflector 140 can comprise several known elements such as, but not limited to, a partially reflective optical plate. Reflector 140 directs a percentage of the intercepted light to another reflective surface 150 which directs the light into reflector 116 from the left side. For a sufficient intensity arriving at grating 116 from the left side, a moving grating is initiated within the SBS cell used for grating 116. If desirable for improving the intensity or for use in conjunction with waveguides, discussed below, a collimator or lens, not shown, can be positioned between reflector 150 and reflector 116. The light arriving at cell 116 is at the same frequency as light arriving at cell 114 so that the moving grating of cell 116 moves to the right with the same velocity as that of cell 114.

Light entering cell 116 from the right side encounters this moving grating and is reflected back toward medium 112 where it is amplified as it then encounters cell 114. Light making multiple passes through the resonator is amplified and has very little frequency walk-off. If the sound velocities in cells 114 and 116 are perfectly matched then there is no round trip frequency walk-off. With gaseous SBS media, pressure variations can be employed to achieve such a matching.

The light for creating the acoustic wave or moving grating in the SBS medium of reflector 116 results from the output of laser 100. While in the first few moments of operation, or passes of radiation, the laser 100 output will be somewhat aberrated, this will correct as reflector 116 operates. The acoustic waves generated in reflector 116 are high quality planar or focused waves and can efficiently drive gain medium 112 as a feedback signal. The result is a mirror that is a high quality flat (or curved) surface for reflector 116 which simultaneously achieves frequency compensation for the shift produced in reflector 114.

To enable a majority of the light reflected from reflector 116 to pass through beam splitter 118, a polarization rotator 180 is included in the reflection path to the left of 118. This would be a rotator conventionally described as a $\lambda/4$ plate.

The improved (or improving) reflected light from reflector 116 which returns to medium 112 is conjugated via grating 114. It is thereafter amplified to provide an improved output. The improved output provides an improved probe, which in turn improves the output, as in a feedback loop. This feedback, however, unlike that of a deformable mirror, is all optical and very fast.

To be more explicit where "$\Omega$" is the base frequency of radiation incident on reflector 116. The reflected signal is doppler shifted by reflection from the acoustic grating moving at a velocity "v", giving a reflected frequency of:

$$\Omega' = \Omega[1-(2v/c)] \qquad (2)$$

where "c" is the velocity of light. The percentage frequency shift is normally a few parts in a million for a gaseous SBS medium.

There may be a parasitic wave of a very very small magnitude reflected from the acoustic grating back to reflectors 140, 150 and into the laser. This small parasitic wave, however, is double shifted from the primary frequency so that it is not supported as a mode by the laser cavity or medium and therefore dies away causing no problem.

The light of frequency "0" that passes through beam splitter 118 and enters reflector 116 from the medium 112 or right side must be sufficiently low in intensity so as to not generate additional sound waves. This light is to be reflected but it should not establish any additional moving gratings. Polarization rotator 190 is a second $\lambda/4$ plate and provides a second polarization rotation of the light impinging on splitter 118 from the right such that the largest portion of the light is reflected by 118. This is accomplished by selecting the amount of energy that is deflected by splitter 118 as well as selecting the type of medium for reflector 116 so as to maintain a high threshold value. In other words, its intensity must be below the SBS threshold.

It is readily understood by those skilled in the art that there are known threshold levels for various SBS media. These can include but are not limited to, gaseous methane, ammonia, carbon monoxide and dioxide, or hydrogen, liquid carbon sulfide, or solid crystals such as barium titanate. Each of these has predictable wavelength and intensity dependencies. Since the output from medium 112 can be predicted from basic laser operating principles, the amount of energy deposited on reflector 116 without splitter 118 in the optical path is also readily computed. From the known threshold limitations the amount of energy that must be reflected out of laser 100 by beam splitter 118 is thereby known, ie., amount of energy in excess of the SBS threshold. Typically laser 100 would operate with only a few percent, i.e., the order of 7 to 15 percent of the laser radiation from medium 118 being incident on the medium or right side of SBS reflector 116. The known reflectivity requirement, percentage of radiation to be reflected out versus transmitted to reflector 116, for splitter 118, is easily translated into a reflective coating requirement by those skilled in the art. The light entering reflector 116 from the medium side is upshifted and re-traverses medium 112 where it is amplified. This light acts as a probe of the medium creating an increased light output that is thus in phase and improved optical quality.

Thus, since it sees an advancing acoustic wave, its reflection is doppler shifted upwards giving:

$$\Omega'' = \Omega'(1+[2v/c]) \quad (3)$$

Due to the nature of beam splitters, a portion of the feedback signal reflected from reflector 116 is also reflected along a direction opposite the output beam and normally lost. If 85 to 93 percent of the radiation emerging from medium 112 is reflected into the output beam and 15 to 30 percent into reflector 116, the lost component would be on less than 4.5 percent. This component can be recovered by employing polarization rotators 160, 180 and 190 and an additional reflective surface 170 positioned on the opposite side of beam splitters 118 from the output beam and reflector 140.

Rotator 160 comprises an element such as, but not limited to, a quarter wave plate and surface 170 can comprise a conventional mirror. The light reflected by surface 170 is rotated by rotator 160 and reflected by reflector 170. It is thereafter, further rotated by rotator 160 and passes through beam splitter 118 as part of the output beam. Alternatively, if rotator 160 is removed during the laser 100 initial start up, then this reflected component is reflected back into reflector 116 and back into medium 112 where it may be useful as a reflected wave for oscillator start-up.

Since it is not necessary nor desirable to have conjugate scattering of light from the left or non-medium 112 side of reflector 116, single-mode waveguides can be used in reflector 116. The use of waveguide structures in the reflector reduces the SBS threshold to very low power levels on the order of a few watts and also the energy at which acoustic gratings are generated. This in turn allows the use of very small amounts of light to create the gratings. Therefore, a concomitantly small percentage of the laser output is directed by reflector 140 to reflector 116, so as not to overcome the SBS process established from the medium side. This provides a maximum output from laser 100 while compensating for wavefoont distortions which also increases the output and efficiency of laser 100.

Additional focusing means, such as lens 200, is employed in laser 100 to increase the intensity of laser radiation incident on the conjugation reflector 114, and improve conjugation fidelity.

As in laser 10, a spatial filter 120 can be employed in laser 100 to allow for transverse mode shaping. The function and apparatus comprising spatial filter 120 is the same as previously described in FIG. 1.

Therefore, what has been described is a laser apparatus which uses two moving reflective gratings to compensate for and remove the effects of aberrations in a laser medium or internal optical elements. The moving gratings are implemented using two SBS cells with only one cell operated as a phase conjugate mirror and the other as a moving grating. The two cells are driven by the same radiation source so as to have the same velocity direction.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen and described to best explain the principles of the invention and its practical application, and to thereby enable others skilled in the art to best utilize the invention in various embodiments and with various modifications as are suited to the particular use contemplated. It is intended that the scope of the invention be defined by the claims and their equivalents.

What is claimed is:

1. A laser, comprising:
   a phase conjugate reflector;
   a stimulated Brillouin scattering (SBS) reflection means spaced from the phase conjugate reflector, said SBS reflection means reflecting an incident optical beam when pumped by optical radiation exceeding a predetermined threshold intensity;
   a laser gain medium disposed along a first optical path between said phase conjugate reflector and SBS reflection means;
   an output coupling means positioned between said laser gain medium and said SBS reflection means for providing an output beam of radiation, the laser generating internal radiation at least some of which is directed away from said gain medium and into said SBS reflection means for reflection thereby;
   a third reflection means positioned in the optical path of an output radiation beam from said output coupling means, said third reflection means intercepting and reflecting a predetermined portion of said output radiation beam which exceeds said predetermined SBS reflection means threshold intensity; and
   a fourth reflection means positioned to receive reflected output laser radiation from said third reflection means and direct it into said SBS reflection means along a second optical path in a direction toward said laser gain medium to generate a moving acoustical grating in said SBS reflection means which reflects laser radiation incident on said grating from said laser gain medium and upshifts the frequency thereof.

2. A laser, comprising:
   a first stimulated Brillouin scattering (SBS) reflection means configured to function as a phase conjugate mirror when pumped by optical radiation exceeding a first predetermined threshold level;
   a second SBS reflection means spaced from the first SBS reflection means, said second SBS reflection means reflecting an incident optical beam when pumped by optical radiation exceeding a predetermined threshold intensity;
   a laser gain medium disposed along a first optical path between said first and second SBS reflection means;
   an output coupling means positioned between said laser gain medium and said second SBS reflection means for providing an output beam of radiation, the laser generating internal radiation at least some of which is directed away from said laser gain medium and into said second SBS reflection means for reflection thereby;

a third reflection means positioned in the optical path of an output radiation beam from said output coupling means so as to intercept and reflect a predetermined portion of said output radiation beam which exceeds said predetermined threshold of said second SBS reflection means; and a fourth reflection means positioned to receive reflected laser radiation from said third reflection means and direct it into said second SBS reflection means along a second optical path in a direction toward said laser gain medium to generate a moving acoustical grating in said second SBS reflection means which reflects laser radiation incident on said grating from said laser gain medium and upshifts the frequency thereof.

3. The laser of claim 1 further comprising spatial filter means positioned along said first optical path between said output coupling means and said SBS reflection means for removing undesirable extraneous modes.

4. The laser of claim 1 wherein said output coupling means is a beam splitter and further comprising:

fifth reflection means positioned to receive and reflect radiation which is reflected by said SBS reflection means and said beam splitter along an optical path opposite to said output beam;

first polarization rotation means disposed between said fifth reflection means and said beam splitter; and second polarization rotation means disposed between said laser gain medium and said phase conjugate reflector.

5. The laser of claim 4 wherein at least one of said first and second polarization rotation means comprises a quarter wave plate.

6. The laser of claim 1 further comprising focusing means disposed along said first optical path adjacent to said phase conjugate reflector for focusing radiation into said phase conjugate reflector.

7. The laser of claim 1 wherein said SBS reflection means comprises a pressurized gas cell containing an SBS gas.

8. A frequency stable laser resonator, comprising:

a phase conjugate reflector;

a stimulated Brillouin scattering (SBS) reflection means spaced from said phase conjugate reflector;

a laser gain medium positioned between said phase conjugate reflector and SBS reflection means;

an output coupling means positioned to redirect a predetermined portion of laser radiation in said laser gain medium into an output beam; and a third reflection means positioned to intercept and redirect a predetermined portion of said output beam into said second reflect ion means in a direction toward said laser gain medium.

9. The laser resonator of claim 8 further comprising a spatial filter means between said SBS reflect ion means and said laser gain medium.

10. The laser resonator of claim 8 further comprising:

a fourth reflect ion means positioned along the optical path of said output beam but on the opposite side of said output coupling means from said third reflection means;

a quarter wave plate disposed between said fourth reflect ion means and said output coupling means; and a quarter wave plate disposed between said phase conjugation means and said laser gain medium.

11. The laser of claim 1 wherein said out coupling means comprises a brewster plate.

12. The laser of claim 11 wherein said third reflection means is a brewster plate.

13. The laser of claim 12 wherein said brewster plate is partially mirrored so as to reflect between about 7 to 12 percent of the incident radiation in said output beam.

* * * * *